United States Patent

[11] 3,528,357

| [72] | Inventor | Wilhelm E. Bertram, Jr., Munich, Germany (2a Hans Corneliusstrasse, 8032 Munich-Graefelfing, Germany) |
|---|---|---|
| [21] | Appl. No. | 522,188 |
| [22] | Filed | Jan. 21, 1966 |
| [45] | Patented | Sept. 15, 1970 |

[54] AUTOMATIC EXPOSURE CONTROL FOR CAMERAS
4 Claims, 3 Drawing Figs.

[52] U.S. Cl. ............................................. 95/64, 324/96, 324/151, 324/154, 352/141, 356/225, 356/227

[51] Int. Cl. ............................................. G03b 7/08, G03b 19/18, G01r 5/06

[50] Field of Search ............................................. 95/10C, 64D; 352/141; 324/151, 151A, 96, 154; 356/225, 227

[56] References Cited
UNITED STATES PATENTS

| 2,982,915 | 5/1961 | Rich et al. | 324/154 |
|---|---|---|---|
| 3,137,223 | 6/1964 | Lamb | 352/141X |
| 3,155,906 | 11/1964 | Roper | 324/154 |
| 3,124,033 | 3/1964 | Freudenschuss | 352/141 |
| 1,934,484 | 11/1933 | Camilli | 352/141 |
| 2,826,740 | 3/1958 | Bernreuter | 324/151(A)UX |
| 3,045,575 | 7/1962 | Akahane | 95/64(D)UX |
| 3,210,664 | 10/1965 | Ahn et al. | 324/151(A)UX |

FOREIGN PATENTS

| 660,763 | 11/1951 | Great Britain | 324/151(A)UX |

*Primary Examiner*—John M. Horan
*Assistant Examiner*—Joseph F. Peters, Jr.
*Attorneys*—William F. Pinsak and John E. Peele, Jr.

ABSTRACT: An improved galvanometer is provided with a relatively weak hairspring having a substantially linear torque characteristic and being coupled to a coil movable through a deflection range by a substantially linear electrical torque. The mechanical torque curve of the hairspring is balanced against the electrical torque curve of the coil to cause the coil to remain stationary at most points in the deflection range.

Patented Sept. 15, 1970

3,528,357

INVENTOR.
Wilhelm E. Bertram Jr.
BY Barry L. Clark
John E. Peek Jr. Attys

AUTOMATIC EXPOSURE CONTROL FOR CAMERAS

This invention relates to an automatic exposure control mechanism for cameras, especially motion picture cameras, having a diaphragm coupled mechanically to a moving coil of an electromagnetic transducer. The coil is coupled to at least one very weak hairspring which, nonetheless, urges the diaphragm to its open position. A light sensitive element is located behind the diaphragm in the light path of the objective of the camera. The light sensitive element is coupled in an electrical circuit to the transducer, and varies the current to the transducer in response to the variations of the ambient scene brightness impinging on the element. Current flow through the coil of the transducer creates an electrical torque to drive the diaphragm in a closing direction, that is, against the mechanical torque created by the hairspring. The electrical torque and mechanical torque are matched so that the diaphragm will remain stationary at any point in the deflection range of the coil, when the current flow through the coil is at a predetermined value, regardless of the scene brightness above a required minimum.

Although the principle of a single coil transducer is known, these transducers all use the spring to move the coil, and therefore the diaphragm, to a fully open position while causing varying quantities of current to flow through the coil so as to close the diaphragm a given amount. In systems employing such transducers, the photocell receives the light directly from the scene without modification by the diaphragm. The quantity of light impinging on the light sensitive element creates a certain current flow which moves the diaphragm a given amount from its wide open position. The quantity of current required, however, is different at all points along the deflection range of the transducer.

A light sensitive element is in circuit connection with the coil. Depending upon the quantity of light incident on the element, the core is pulled more or less into the coil, against the force of the spring. This movement is translated by means of the geared rack to adjust the diaphragm until its aperture permits a predetermined quantity of light to impinge on the light sensitive element. If the scene light varies, the diaphragm will be adjusted.

However, a practical automatic exposure control system in accordance with the above described principle, such as the above proposal, has not previously been constructed. Several problems had to be solved to get the desired consistent accuracy. Since the characteristic curves of the moving coil and spring do not agree, an even adjustment over a wide range of apertures is impossible. Furthermore, the spring is fully relaxed in darkness, when it has pulled the iris open. Thus, under low light levels, the spring exerts very little force, and, the aperture adjustment to the light level desired, by the force of the moving coil, is not precise. The usable range, where fine aperture regulation is theoretically possible, is therefore very small and excludes very high as well as very low light levels. During practical operation of the aforementioned mechanisms, friction is also too high to enable the very fine iris adjustments desired. In such mechanisms, to obtain the desired practically inertia-free reaction between the coil and the spring is nearly impossible. Also, the mass-inertia of the individual parts, for instance, of the core of the moving coil and the rack, is much too great to assure instantaneous regulation. Because of high friction forces in the regulating mechanism, a very strong spring is employed to bring the iris back to its original position under a dark condition. This strong spring, therefore, requires considerable electrical torque and consequently necessitates amplification of the current as varied by the light sensitive element. A strong tension spring inherently has a steep characteristic curve, and further, deviates unfavorably from the characteristic curve of the moving coil.

The invention therefore is based upon the solution of the requirement to create an exposure control system, as mentioned before, which through a simple and economic construction assures dependable, sensitive and inertia-less automatic exposure control.

This problem, according to the present invention, is solved by essentially matching the characteristic curve of the spring against the characteristic curve of the electromagnetic transducer. Whereby the transducer, in a conventional manner, is a moving coil instrument such as a galvanometer and has at least one spiral spring, which, however, is very weak, when compared to conventional spiral springs, and may be pre-stressed or pre-torqued, by turning, to obtain the desired matching of the characteristic curves.

By developing the exposure regulating system, according to this invention, it is possible to match the electromagnetic characteristic curve of the transducer, controlled by the light-sensitive element, to the characteristic curve of the spring which is also coupled to the transducer. By pre-stressing each spring of the galvanometer, neither spring is completely load-free when the diaphragm is in its open position. Therefore, the exposure control system according to the invention, never works in the unfavorable, low region of the spring force. By utilizing at least one soft spiral spring, a flat spring characteristic curve is achieved. The moving coil instrument may be mounted —almost friction-free— on pointed tips so as to have almost no inertia. A very fast regulation over a wide brightness range with reliable precision is thereby assured. The current conduction from the light sensitive element to the moving coil of the galvanometer is achieved by conventional and very simple means, such as the spiral spring or springs. Calibration of the exposure control system, in accordance with this invention, is accomplished by passing pre-determined currents through the moving coil of the transducer. By twisting the spiral spring, or if necessary, several spiral springs relative to the housing, the characteristic curve of the spring is matched to the electromagnetic characteristic curve of the moving coil.

After calibration, the light sensitive element is connected to the moving coil of the transducer. However, due to manufacturing limitations, variations exist in the effects of varying light levels on the light sensitive element, as it is subjected to light. These variations cause small deviations from the illumination calibration values. In order to achieve a later fine adjustment of the electromagnetic characteristic curve corresponding to the characteristic curve of the spring of the moving coil instrument, connected to the light sensitive element, the galvanometer is constructed so that its core magnet can be rotated and locked in the desired position relative to the housing and moving coil. This exposure control system is therefore precisely adjustable, and permits, because of the flat spring characteristic curve and the precise matching possibility between the characteristic curves of the spring and the galvanometer, a very reliable regulation of aperture openings over a very wide brightness range.

Translation of the circular movement of the moving coil to the diaphragm of the camera is possible by simple mechanical means creating very little friction. For instance, the diaphragm may be constructed as a two bladed iris with one blade fastened directly to the moving coil about the latter's axis of rotation so that it will revolve with the coil, and therefore vary the quantity of light passing through the objective of the camera as required by the scene brightness.

For fine adjustment of the electromagnetic torque characteristic curve of the present galvanometer, it is advantageous to shape the magnetic field, and therefore the strength of the magnetic field in which the coil moves between the core magnet and a surrounding yoke connected to the galvanometer's housing. Shaping of the field is accomplished by providing cut-outs in the yoke, and by orienting the core magnet relative to the yoke. Thus, a desirable orientation of the magnetic field can be chosen, dependent on the relative position of the core magnet with respect to the yoke cut-outs.

A fine adjustment of the electromagnetic characteristic curve of the galvanometer is also possible by providing the core magnet with a desired shape. A preferred shape for the magnet is in the form of a round cylinder having at least one flat portion on the circumference. Thus, by turning the core magnet with respect to the housing, and, if necessary, relative to the yoke, a very sensitive orientation and setting of the field strength of the magnetic field is achievable.

Additional features, advantages and various objects of this invention will be understood from the following description and the associated drawings in which an example of the invention is shown, wherein.

Figure 1:
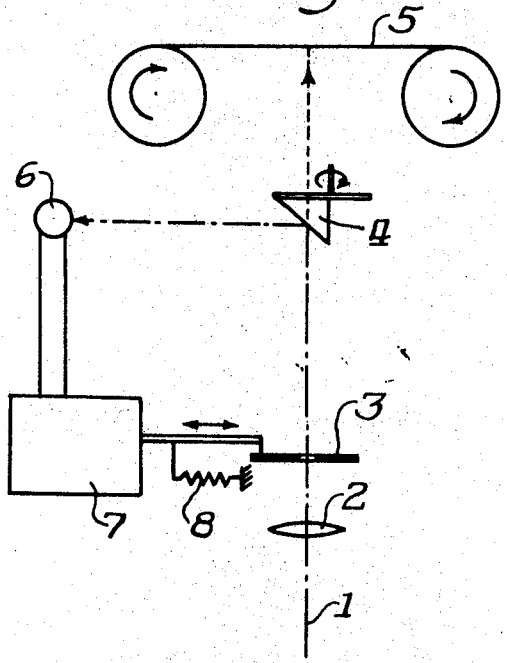
FIG. 1 is a schematic sketch showing the principle, involved in construction of a movie camera with an automatic exposure control system, in accordance with this invention.
Figure 2:
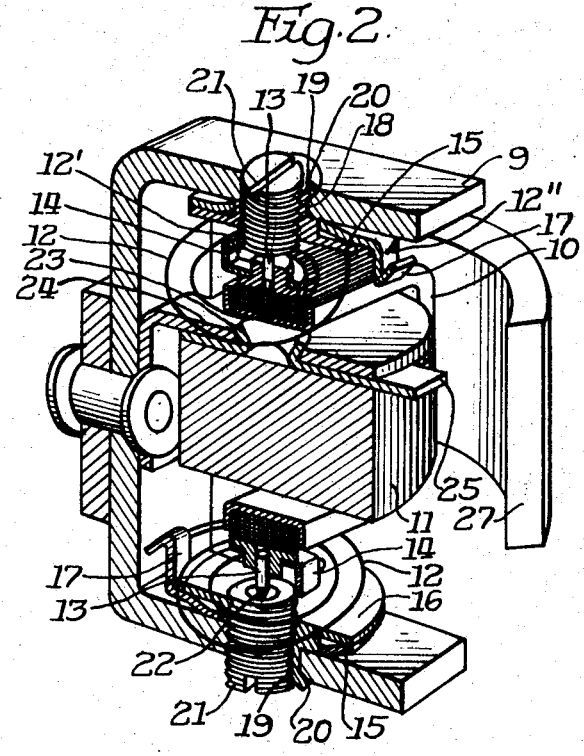
FIG. 2 is an axially sectioned perspective view of a galvanometer in accordance with this invention.

Referring to FIG. 1, a motion picture camera with an automatic exposure control system in accordance with the principle of the present invention, is shown. Light rays enter the camera along an optical axis 1 defined by a lens 2 used to receive, focus, and transmit these rays. A typical shutter 4 having a reflective surface is positioned along the axis 1 to intermittently interrupt the light rays passing therealong. Shutter 4, which may be of either the reciprocating or rotating type, is disclosed as being of the rotary type normally mounted to be rotatably driven within the housing of the camera.

When the reflective shutter is cyclically operated, it periodically interrupts the optical axis 1, temporarily preventing light rays from the lens 2 from reaching a film 5. During the remainder of the cycle, the light rays pass further to the interior of the camera to impinge upon the film 5, while it is held stationary for exposure.

When the reflective shutter 4 interrupts the optical axis 1, light rays passing through lens 2 are directed toward a light sensitive element 6, for example, a photoresistor. Although the light rays impinging on the element 6 are alternately in an "off-on" state, the effect on the element energization will produce results corresponding to an average light level.

Photoresistor 6 is electrically connected in a circuit with an electromagnetic transducer 7, such as a galvanometer or solenoid. The circuit further includes a battery from which current flows to a coil 10 of the transducer 7. This current flow is regulated by the photoresistor in response to the quantity of light impinging on it. The current flow is thereby varied as the quantity of ambient light from a scene changes, and passes through objective 2 and diaphragm 3 to impinge on photoresistor 6. Setting of the diaphragm 3 is thereby made in response to the prevailing scene brightness, so as to permit only the quantity of light for proper exposure of the film 5 to impinge upon that film. The transducer 7 is mechanically coupled with the diaphragm 3, and varies the aperture of the diaphragm against the force of a spring 8 coupled to the transducer, depending on electrical torque determined by the quantity of light impinging on photoresistor 6.

Figure 3:
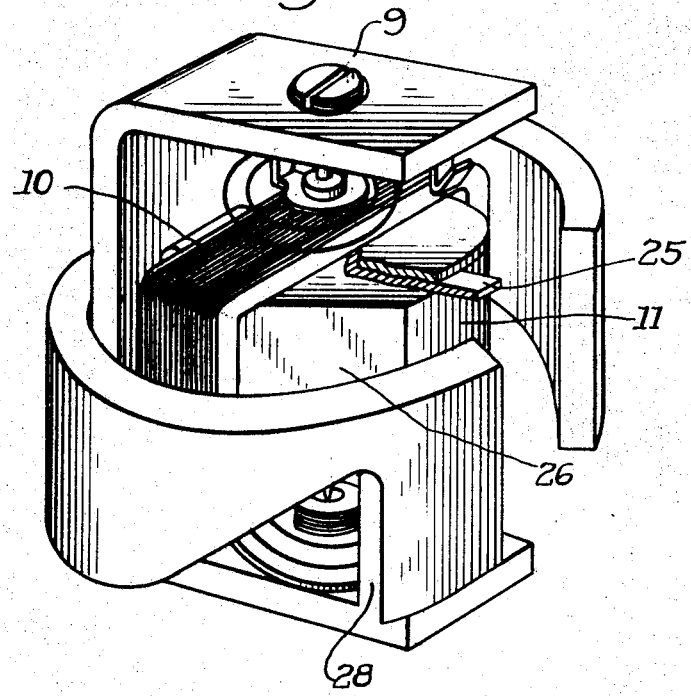
FIG. 3 is a partially sectioned external view of the galvanometer according to FIG. 2.

For exact setting and orientation of the electromagnetic characteristic curve of the galvanometer, the core magnet 11 is rotatably adjustable relative to the housing 9 and coil 10 about an axis in line with the coil axis 13. For this purpose, an arm 25 extends radially from the core magnet, which is suspended in a pivot bearing 23 on a lever 24, fastened to housing 9. On the round cylinder surface of the core magnet 11 are two parallel flats 26, one of which is visible in FIG. 3. The galvanometer has a fixed conventional yoke which surrounds the coil 10 and core magnet 11 and is connected to the instrument housing 9. The yoke has cut-outs 28, shown in FIG. 3. The magnetic field may be precisely oriented and its magnitude or field strength set by manually turning the core magnet 11 relative to the housing 9 and yoke 27 with the arm 25. Thus, the electromagnetic characteristic curve of the galvanometer or the characteristic curve of magnetic flux density may be very precisely adjusted by relative positioning of the flats 26 on the core magnet 11 with respect to the yoke 27 with its cut-outs 28, and with respect to the deflection range through which coil 10 moves.

The magnetic field may be more accurately defined in terms of the flux distribution therein. The distribution of flux B, is of a character following a curve as determined by the formula —

$$B = B_0 (\cos \theta) P$$

wherein $B_0$ is the maximum flux of the magnetic pole of the magnet 11, and the exponent $p$ is determined by the magnet material, and $\theta$ is the angle of deflection of the coil away from a polar axis (not shown) through the magnet 11. The maximum value is reached when the deflection is 0° and the minimum when the deflection is 90°. The values of the flux density in the optimum deflection range are such, however, as to be capable of description as being substantially linear and essentially linearly increasing with the highest density occurring adjacent the polar axis, when employing the relatively small angular increment (45° or less) as does the present galvanometer form.

By turning and pre-stressing the spiral spring 12, on one hand, and turning the core magnet 11, on the other hand the spring characteristic curve and the magnetic flux density characteristic curve of the galvanometer, may be trimmed exactly in the case of the exposure control system according to the invention. Therefore, an aperture regulation over a wide range of scene brightness is possible with great reliability.

The spiral springs 12 are selected with a substantially linear torque vs. deflection characteristic. Adjustment of the tension adjusting disc members 16 enable the springs to be pretorqued to obtain the desired zero suppression, i.e. the torque required prior to initiating closing movement of the coil against the hairspring, the resistance of which increases as the blades close. The springs are generally tensioned with a torque greater than that necessary to urge the diaphragm to its wide open positions. Thus, a reduction of current flow through coil 10 below a critical value permits the blades to open the aperture. A new balance condition will be reached by the increased quantity of light which causes the current flow again to equal the critical value. The slight increase in the electrical torque due to the non-constant but approximately linearly increasing flux density is satisfactorily equalized by the corresponding increase in torque due to the increased deflection of springs 12, and only a relatively small change in current flow is required for deflection throughout the range. Thus, the resulting electrical torque urging the coil in one direction of movement is balanced by the mechanical torque of the springs urging the coil in the opposite direction of movement. The spring torque is desirably equal to the electrical torque throughout the deflection range while the current is maintained substantially constant.

As the light level of the scene to be photographed varies, so will the resistance of the photoresistor 6 and therefore the current passing through the coil 10. The coil 10 will be deflected within the magnetic field with each current change. The degree of deflection will be affected by the flux density distribution in the air gap. Deflection will continue, however, only until the electrical torque generated by the current flow in the coil moving through a magnetic flux field is balanced by the opposing mechanical torque of the spring 12. In this preferred construction, the current flow is only slightly non-linearly increasing between ends of the range through which the coil will be moved. Therefore, for a given light level, a given balance will result in a correspondingly sized aperture. A change in light level will cause the systems to seek a new steady state condition thereby moving coil 10 and readjusting the size of the aperture. Through this adjustment and readjustment process, a substantially uniform intensity of light is automatically maintained to assure proper exposure of the film 5.

Activation of the diaphragm may be done by mounting one iris blade directly onto the coil 10 so as to turn about axis 13. During rotation of the coil 10, this iris blade thus swings with it to determine an aperture opening. From this one iris blade, other iris blades may be driven.

The friction in the moving coil instrument is practically negligible because of the conical tip bearings of the coil axis 13. By using a suitable diaphragm construction, for instance the above mentioned iris blades, the total friction forces are extremely low, so that a very good aperture adjustment is possible with very low electromagnetic torque forces. The galvanometer may therefore be adjusted by current controlled directly from a sensitive photo resistor without the need for amplification of the current.

In darkness, the moving coil 10 of the galvanometer is driven by the spiral springs 12 to a position where the diaphragm is open. In this position, however, both springs 12 are still under tension, assuring that the galvanometer never need operate in the lower portion of the spring characteristic curve, where the spring forces are too low to assure an even rotation of the moving coil 10. Thereby, a uniform aperture regulation is attained. With increasing light, the moving coil 10 is rotated progressively relative to the housing and against the force of the spiral springs 12, until the aperture of the diaphragm is closed. Because of the light mass of the moving coil, diaphragm regulation occurs practically instantaneously with a change in the quantity of light reflected from the scene.

The invention is not limited only to the described example. For instance, the yoke 27 may be developed without cut-outs, or it may be omitted entirely. It is also possible, to use a core magnet 11, which does not have a flat 26 or features more than two flats. It is possible, also, to mount the core magnet on an axis aligned with axis 13, but not coincident with it. The core magnet can also be non-circular in cross-section, for instance with an elliptical section. It is, for example, also possible to provide only one spring, instead of the two spiral springs 12, which single spring is fastened on one side of the moving coil 10. When two spiral springs 12 are used, it is also possible, for instance, to omit the suspension 15 of one of the spiral springs, and fasten one end 12″ thereof directly on the housing 9. The pre-stressing of both spiral springs 12 occurs then when one spring 12 is turned in the remaining suspension 15.

It is to be understood that modifications and variations may be effected without departing from the scope of the novel concepts of the present invention.

I claim:
1. An electromagnetic device comprising:
   a frame;
   an electromagnetic assembly, having a substantially linear electromagnetic characteristic, mounted within said frame;
   said electromagnetic assembly comprising a permanent magnet component and a coil component, both of said components being mounted rotatably on a common axis, at least one of said components being unsymmetrical about said rotational axis, one of said components being a freely movable member and the other of said components being a releasably fixed member;
   means for limiting the rotational arc of said freely movable member to a continuous arc of less than 90°;
   responsive means coupled with said coil for varying electric current therein in response to a variable condition;
   spring means, having a substantially linear spring characteristic, coupled with said freely movable member for applying a torque thereto opposite to the magnetic torque of said electromagnetic assembly;
   means for adjusting the substantially linear spring characteristic of said spring means; and
   matching means for matching the substantially linear electromagnetic characteristic of said electromagnetic assembly to said substantially linear spring characteristic, whereby said torques are balanced across said limited rotational arc of said freely movable member and said freely movable member remains stationary at any point in said limited rotational arc, said matching means including means for adjusting the orientation of said releasably fixed member with respect to said limited rotational arc of said freely movable member.

2. The device set forth in claim 1 wherein said permanent magnet is releasably fixed and unsymmetrical about said rotational axis.

3. The device set forth in claim 2 wherein said responsive means comprises a photoresistor and said spring means comprises a hairspring.

4. The device set forth in claim 3 wherein said freely movable member is coupled with an adjustable diaphragm for varying the opening of said diaphragm in response to varying light intensity.